(12) United States Patent
Long

(10) Patent No.: US 8,602,942 B2
(45) Date of Patent: Dec. 10, 2013

(54) CENTRIFUGAL DE-CLUTCH

(75) Inventor: Geoffrey A. Long, Montara, CA (US)

(73) Assignee: Zee.Aero Inc., Mountain View, CA (US)

( * ) Notice: Subject to any disclaimer, the term of this patent is extended or adjusted under 35 U.S.C. 154(b) by 83 days.

(21) Appl. No.: 13/298,154

(22) Filed: Nov. 16, 2011

(65) Prior Publication Data

US 2013/0118856 A1 May 16, 2013

(51) Int. Cl.
  *B60W 10/18* (2012.01)
(52) U.S. Cl.
  USPC ......... 477/186; 477/199; 477/195; 192/219.4
(58) Field of Classification Search
  USPC ....................................................... 477/195
  See application file for complete search history.

(56) References Cited

U.S. PATENT DOCUMENTS

| | | | | |
|---|---|---|---|---|
| 2,951,540 | A * | 9/1960 | Hawkins | 192/13 R |
| 5,280,828 | A | 1/1994 | Reynoso et al. | |
| 5,601,160 | A * | 2/1997 | Horsch | 188/71.5 |
| 5,853,145 | A * | 12/1998 | Carter, Jr. | 244/17.25 |
| 5,988,328 | A * | 11/1999 | Newport | 188/186 |
| 6,277,463 | B1 * | 8/2001 | Hamilton et al. | 428/106 |
| 6,845,831 | B2 * | 1/2005 | Smith et al. | 180/53.1 |
| 2002/0125368 | A1 | 9/2002 | Phelps, III et al. | |
| 2002/0153450 | A1 * | 10/2002 | Sims et al. | 244/17.11 |
| 2004/0247436 | A1 * | 12/2004 | Guimbal | 416/131 |
| 2008/0197639 | A1 * | 8/2008 | Brander | 290/55 |
| 2010/0065392 | A1 | 3/2010 | Mohan et al. | |

FOREIGN PATENT DOCUMENTS

| | | |
|---|---|---|
| JP | 2004-312218 | 11/1992 |
| KR | 10-0887836 | 3/2009 |

OTHER PUBLICATIONS

PCT International Search Report and Written Opinion, PCT Application No. PCT/US2012/064978, Mar. 28, 2013, ten pages.

* cited by examiner

*Primary Examiner* — David D Le
*Assistant Examiner* — Mark Manley
(74) *Attorney, Agent, or Firm* — Fenwick & West LLP

(57) ABSTRACT

A mechanical mechanism is used to prevent a rotor of an aircraft from rotating when the rotor is not in use. The mechanical mechanism disengages when the speed of the rotor exceeds a speed threshold and the mechanism reengages when the speed of the rotor is below the speed threshold.

17 Claims, 4 Drawing Sheets

CENTRIFUGAL DE-CLUTCH

BACKGROUND

1. Field of the Invention

This disclosure describes mechanical mechanisms that mechanically prevent a rotor from rotating below a threshold speed, but allow the rotor to rotate freely above the threshold speed.

2. Description of Related Art

The rotary wing aircraft, or helicopter, is one common type of vertical takeoff and landing (VTOL) aircraft. VTOL aircraft have large rotors that provide either or both vertical and horizontal thrust. Often, when a rotor is not being used, the rotor is kept stationary.

Conventional systems typically use a motor that is coupled to the rotor and adapted to prevent the rotor from rotating when it is not in use. The motor applies a torque to keep the rotor stationary. Thus, conventional systems require the supply of energy to the motor in order to reject disturbance torques that would cause the rotor to rotate. Supplying the energy required to keep the rotor stationary drains energy from a battery that provides the energy to the motor and also causes the motor to generate unwanted heat.

SUMMARY

The described embodiments provide a centrifugal de-clutch. The centrifugal de-clutch is a mechanical mechanism that mechanically prevents a rotor of an aircraft from rotating. The centrifugal de-clutch comprises a plurality of high friction pads, a plurality of flexures, and a plurality of stop tabs according to one embodiment.

In one embodiment, a rotor assembly of an aircraft comprises a rotor, a motor comprising a stationary part and a rotating part, and the centrifugal de-clutch. In particular, the centrifugal de-clutch is coupled to the rotating part of the motor such that the flexures of the de-clutch preload the high friction pads against the stationary part of the motor. The high friction pads prevent the rotor from rotating until the motor generates enough torque to overcome the friction force generated by the friction pads. As the rotational speed of the rotor increases, a proof mass that is mounted to or that is a part of each flexure applies a centrifugal force on the friction pads that counteracts the flexure preload. Above a certain speed threshold, the friction pads are completely disengaged from the stationary part of the motor, thereby allowing the rotor to rotate freely.

The features and advantages described in this summary and the following detailed description are not intended to be limiting. Many additional features and advantages will be apparent to one of ordinary skill in the art in view of the drawings, specification and claims.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
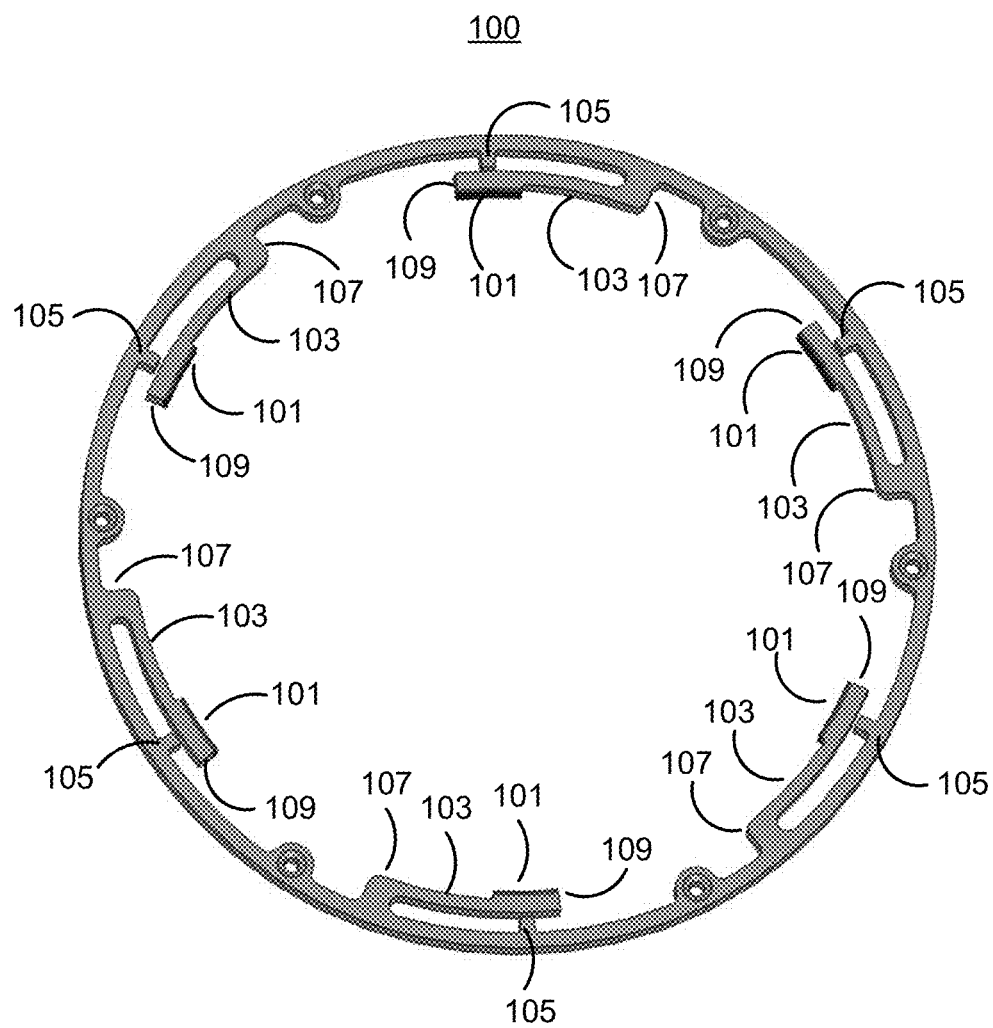
FIG. 1 illustrates a centrifugal de-clutch in accordance with one embodiment.

FIG. 1 illustrates a centrifugal de-clutch 100 in accordance with one embodiment. The centrifugal de-clutch 100 is a mechanical mechanism that mechanically prevents a rotor of an aircraft from rotating. In one embodiment, the centrifugal de-clutch is constructed out of metal (e.g., steel, titanium, or aluminum) or composite material (e.g., carbon fiber or Kevlar). Note that in other embodiments other materials may be used to construct the centrifugal de-clutch.

In one embodiment, the centrifugal de-clutch is a circular monolithic ring comprising a plurality of friction pads 101, a plurality of flexures 103, and a plurality of stop tabs 105. The friction pads 101 are composed of brake pad material (asbestos, organic, or semi-metallic formulations) that provide a high coefficient of friction such as 0.1 to 5. Note that other coefficients of friction may be used. The monolithic ring includes an inner circumference and an outer circumference and the monolithic ring is formed to include flexures 103. The flexures 103 extend circumferentially from the inner circumference in a same direction along the inner circumference of the monolithic ring. The flexures 103 are curved arms each comprising a first end 107 and a second end 109 according to one embodiment. In one embodiment, the flexures 103 are "L" shaped. The first end 107 of a flexure 103 is connected to the centrifugal de-clutch 100. The second end 109 of each flexure 103 is not connected to the centrifugal de-clutch and is coupled to a friction pad 101. A friction pad 101 may be coupled to the second end of a flexure 103 using adhesive or other mechanisms such as fasteners (e.g., screws or rivets).

The stop tabs 105 prevent the flexures 103 from moving outside of a predefined range of movement. The stop tabs 105 thus prevent the flexures 103 from being damaged (i.e., breaking). As shown in FIG. 1, the stop tabs 105 protrude toward the center of the centrifugal de-clutch 100. In one embodiment, the stop tabs 105 are positioned on the centrifugal de-clutch 100 at a location proximate to the second end 109 of the flexures 103.

Figure 2:
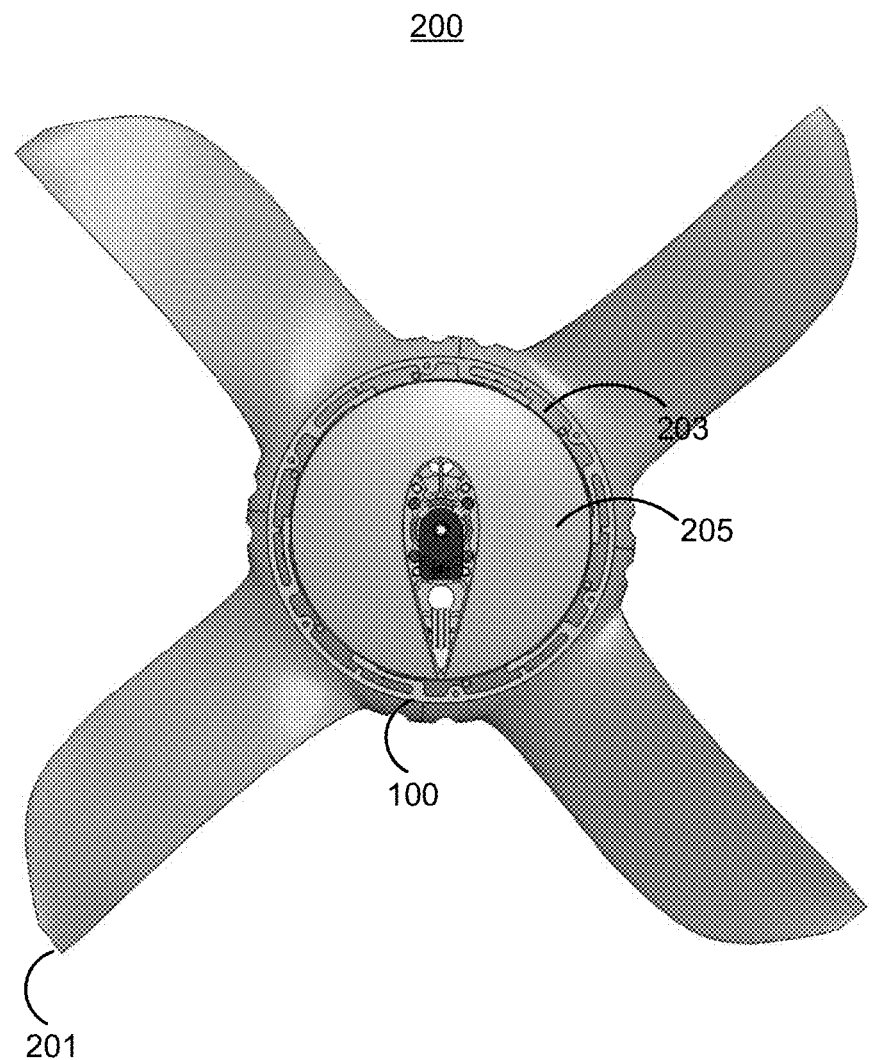
FIG. 2 illustrates a rotor assembly including the centrifugal de-clutch in accordance with one embodiment.

Referring now to FIG. 2, a rotor assembly 200 is illustrated in accordance with one embodiment. The rotor assembly 200 includes a rotor 201 that in one embodiment has a 16 inch radius, and is made from carbon fiber composite material, and in an alternative embodiment from carbon fiber composite blades attached to an aluminum hub. In other embodiments, rotor 201 is made from wood blades attached to an aluminum hub, or wood blades attached to a carbon fiber composite hub. The rotor may be a single piece that bolts onto the motor assembly. The rotor 201 may comprise blades attached to a hub, or may be manufactured as a single piece with an integral hub. The hub provides a central structure to which the blades of the rotor 201 connect, and in some embodiments is made in a shape that envelops the motor.

In one embodiment, the rotor assembly 200 also includes a motor. The motor includes a rotating part 203 (portion) and a stationary part 205. In one embodiment the rotating part 203 is concentric to the stationary part 205, known as a radial flux motor. In this embodiment, the stationary part 205 may form the inner ring of the motor, known as an outrunner motor. In some embodiments the motor parts are low-profile so that the entire motor fits within the hub of the rotor, presenting lower resistance to the air flow when flying forward. The rotor 201 is attached to the rotating part 203 of the motor. Thus, when the rotating part 203 of the motor rotates, the rotor 201 also rotates. The stationary part 205 of the motor is attached to the propulsion boom of the aircraft. In some embodiments, the motor is a permanent magnet motor and is controlled by an electronic motor controller. The electronic motor controller sends electrical currents to the motor in a precise sequence to allow the rotor 201 to turn at a desired speed or with a desired torque.

Figure 3A:
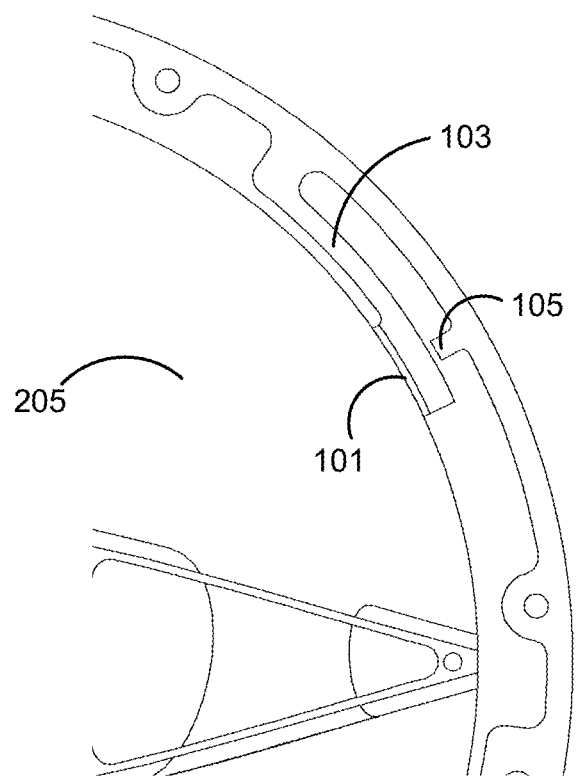
FIGS. 3A and 3B respectively illustrate the centrifugal de-clutch when engaged and disengaged in accordance with one embodiment.

As shown in FIG. 2, the centrifugal de-clutch 100 is included in the rotor assembly 200. In one embodiment, the centrifugal de-clutch 100 is coupled to the rotating part 203 of the motor via fasteners such as screws or rivets. The centrifugal de-clutch is mounted to the rotating part 203 of the motor such that the flexures 103 preload the high friction pads 101 against the stationary part 205 of the motor included in the rotor assembly 200. When the rotating part 203 of the motor is stationary, the high friction pads 101 press against the stationary part 203 of the motor preventing the rotor 201 from rotating. That is, the friction provided by the friction pads 101 resists motion. FIG. 3A illustrates the centrifugal de-clutch 100 when engaged. Particularly, FIG. 3A shows a flexure 103 preloading a friction pad 101 against the stationary part 205 of the motor when the rotating part 203 of the motor is not rotating or is rotating below a speed threshold.

If the motor provides a torque that overcomes the friction torque provided by the flexures 103 preloading the friction pads 101 on the stationary part 205 of the motor, the rotating part 203 of the motor rotates thereby causing the rotor 201 to also rotate. When the rotating part 203 is rotating, a proof mass that is mounted to or is a part of each flexure 103 applies a centrifugal force on the high friction pad 101 mounted on each flexure 103. The centrifugal force counteracts the preload on the stationary part 205 provided by the flexures 103.

Figure 3B:
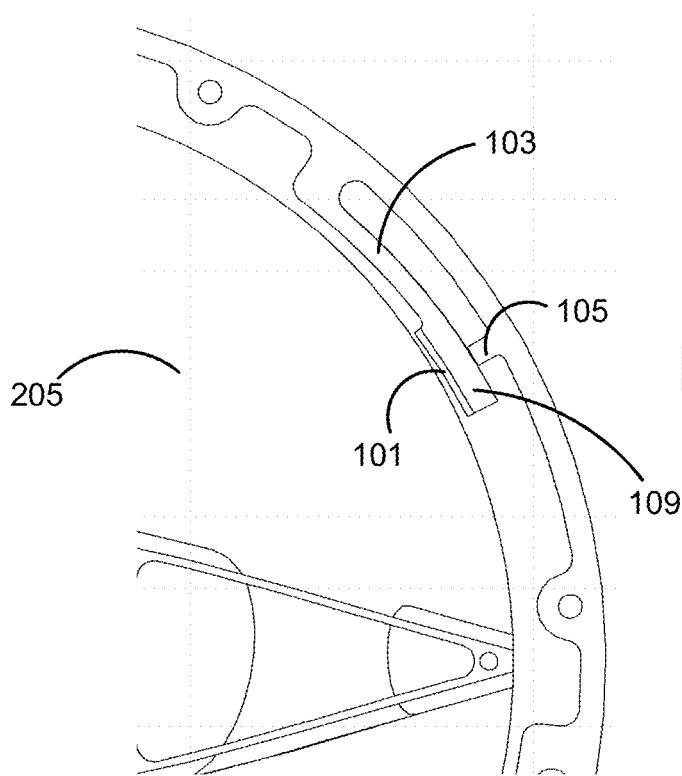

As the speed of the rotating part 203 of the motor increases, the centrifugal force increases resulting in reduced friction torque because the flexures 103 begin to bend away from the stationary part 205 of the motor thereby disengaging the friction pads 101. At a threshold speed, the friction pads 101 are completely disengaged from the stationary part 205 of the motor allowing the rotating part 203 and rotor 201 to rotate freely without any friction torque from the friction pads 101. In particular, the centrifugal force at the threshold rotational speed causes the flexures 103 to bend outward thereby resulting in the friction pads 101 no longer being in contact with the stationary part 205 of the motor. The stop tabs 105 prevent the flexures 103 from bending too far outward and causing damage to the flexures 103. FIG. 3B illustrates the friction pad 101 completely disengaged from the stationary part 205 of the motor. As shown in FIG. 3B, the friction pad 101 is no longer in contact with the stationary part 205 of the motor and the second end 109 of the flexure 103 is in contact with the stop tab 105. As the speed of the rotating part 203 of the motor decreases below the threshold speed, the flexures 103 begin to preload the friction pads 101 against the stationary part 205 of the motor as shown in FIG. 3A.

Proof Mass Calculation

As mentioned previously, a proof mass that is mounted to or is a part of each flexure 103 applies a centrifugal force on high friction pad 101 mounted on each flexure 103. In one embodiment, the proof mass is calculated according to the following variables:

τ=torque applied by the centrifugal de-clutch;
$\omega_r$=speed at which there is no torque applied by the centrifugal de-clutch;
$F_n$=force of the friction pad 101 on the stationary part 205 of the motor;
$F_f = \mu F_n$=friction force;
R=radius of the stationary part 205 of the motor;
$m_p$=mass of the proof mass; and
μ=coefficient of friction of the friction pad 101.

Assume that the flexures 103 provides a preload torque such that τ(0 rpm)=$\tau_0$=μ$F_0$R. The preload at 0 rpm represents the desired brake torque provided by the de-clutch 100. In one embodiment, the centrifugal force is represented as a function of the above variables as shown below:

$$F_n(\omega) = F_0 - m_p R\omega^2 \quad (1)$$
$$F_n(\omega) = \frac{\tau_0}{\mu R} - m_p R\omega^2$$

$$\tau(\omega) = \mu R F_n(\omega) \quad (2)$$
$$\tau(\omega) = \mu R\left(\frac{\tau_0}{\mu R} - m_p R\omega^2\right)$$
$$\tau(\omega) = \tau_0 - \mu m_p R^2 \omega^2$$

As described in equation (1), the force of the friction pad 101 on the stationary part 205 of the motor at speed ω is equal to the force of the friction pad on the motor at zero RPM ($F_0$) minus the magnitude of the centripetal force of the proof mass ($m_p R\omega^2$). The torque (τ(ω)) at speed ω is derived by substituting equation (1) into the equation for torque (τ(ω)).

If $\omega_r$ is specified, equation (2) can be simplified to determine the mass of the proof mass as represented by equation (3) shown below:

$$0 = \tau_0 - \mu m_p R^2 \omega^2 \quad (3)$$
$$m_p = \frac{\tau_0}{\mu R^2 w_r^2}$$

Based on equation (3), if $\tau_0$ is 10 Nm, R is 2.75 inches, $\omega_r$ is 500 revolutions per minute (rpm), and μ is 0.5, then the mass of the proof mass is 3.3 pounds for example. If $\omega_r$ is changed to 1,500 rpm, then the proof mass is 0.4 pounds for example.

Aircraft

Figure 4:
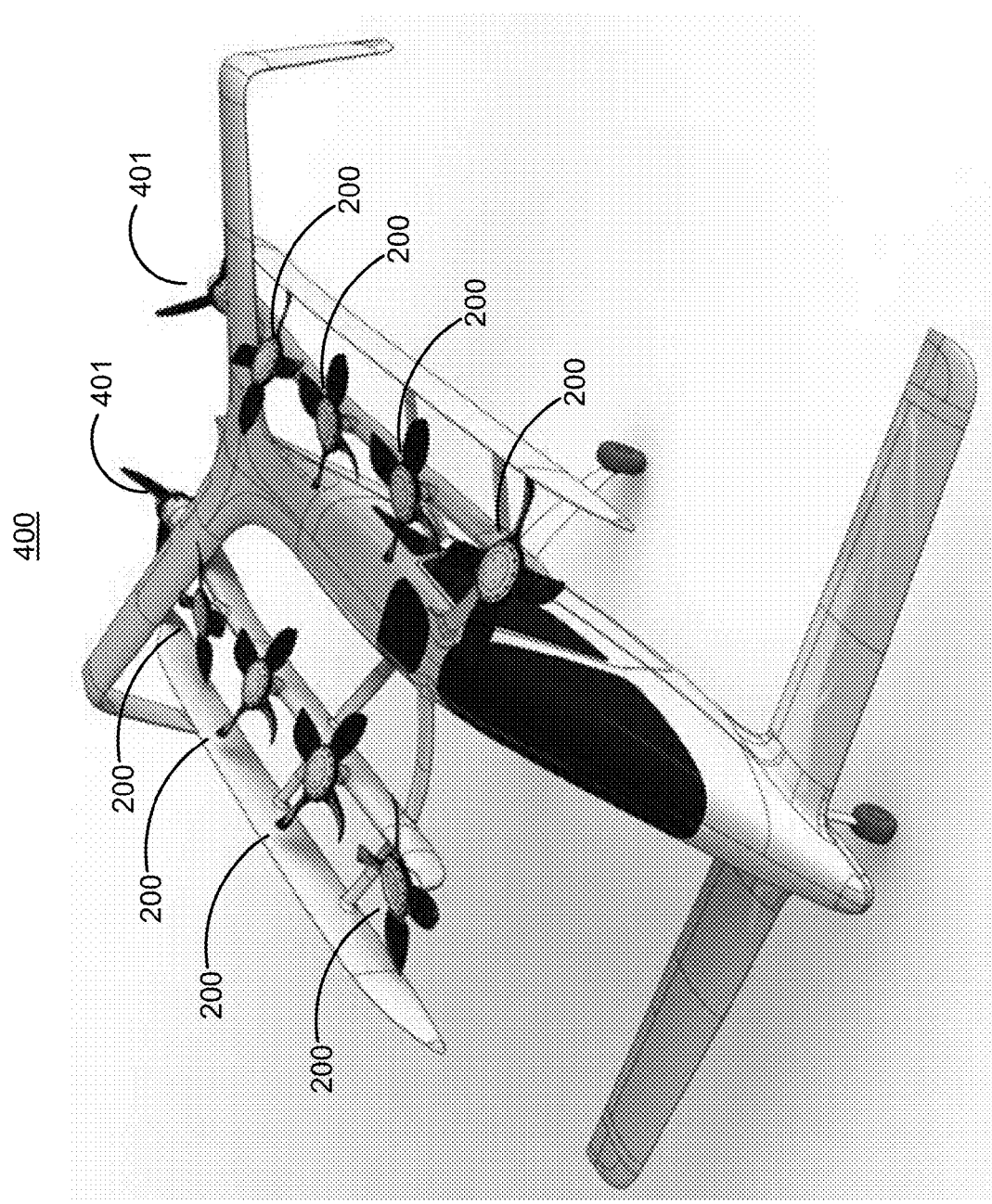
FIG. 4 illustrates a view of a personal aircraft vehicle that incorporates the centrifugal de-clutch in accordance with one embodiment.

Referring now to FIG. 4, an aircraft 400 is illustrated that incorporates the rotor assembly 200 shown in FIG. 2. The aircraft 400 uses the rotor assemblies 200 for vertical lift. Specifically, the rotor assemblies 200 provide enough thrust to lift the aircraft 400 off the ground and maintain control. When at an appropriate altitude, in one embodiment the rotor assemblies 200 are turned off since they are used for vertical lift. Forward flight propellers 401 are used for forward propulsion. The centrifugal de-clutch 100 described above keeps the rotor assemblies 200 stationary when not in use according to the description above.

Although this description has been provided in the context of specific embodiments, those of skill in the art will appreciate that many alternative embodiments may be inferred from the teaching provided. Furthermore, within this written description, the particular naming of the components, capitalization of terms, the attributes, data structures, or any other structural or programming aspect is not mandatory or significant unless otherwise noted, and the mechanisms that implement the described invention or its features may have different names, formats, or protocols. Further, some aspects of the system including components of the flight computer 500 may be implemented via a combination of hardware and software or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

Electronic components of the described embodiments may be specially constructed for the required purposes, or may comprise one or more general-purpose computers selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

The invention claimed is:

1. A rotor assembly comprising:
   a rotor;
   a motor comprising a stationary part and a rotating part, the rotating part coupled to the rotor; and
   a centrifugal de-clutch coupled to the rotating part of the motor, the centrifugal de-clutch comprising a plurality of friction pads and a monolithic ring including an inner circumference and an outer circumference, the monolithic ring formed to include a plurality of flexures extending circumferentially from the inner circumference in a same direction along the inner circumference of the monolithic ring;
   wherein the plurality of flexures are configured to preload the plurality of friction pads against the stationary part of the motor to resist rotation of the rotor below a speed threshold of the rotor to engage the centrifugal de-clutch; and
   wherein the plurality of flexures are configured to disengage the plurality of friction pads from the stationary part of the motor to allow the rotor to freely rotate above the speed threshold to disengage the centrifugal de-clutch.

2. The rotor assembly of claim 1, wherein the rotor comprises a plurality of blades and a hub, the plurality of blades coupled to the hub.

3. The rotor assembly of claim 1, wherein the rotor is made from carbon fiber.

4. The rotor assembly of claim 1, wherein the rotor is made from composite material.

5. The rotor assembly of claim 2, wherein the hub is made from aluminum.

6. The rotor assembly of claim 1, wherein the monolithic ring is formed to further include a plurality of stop tabs protruding from the inner circumference towards the center of the monolithic ring, each stop tab configured to prevent one of the plurality of flexures from bending beyond a position of the stop tab.

7. The rotor assembly of claim 1, wherein the centrifugal de-clutch is made from a metal selected from a group of metals consisting of aluminum, steel, and titanium.

8. The rotor assembly of claim 1, wherein the centrifugal de-clutch is made from a composite material.

9. The rotor assembly of claim 8, wherein the composite material comprises carbon fiber.

10. The rotor assembly of claim 1, wherein each flexure comprises a first end and a second end, the first end formed to extend circumferentially from the inner circumference of the monolithic ring.

11. The rotor assembly of claim 10, wherein each of the plurality of friction pads is attached to a second end of one of the plurality of flexures.

12. The rotor assembly of claim 1, wherein the plurality of friction pads is made of brake pad material.

13. The rotor assembly of claim 1, wherein the rotor assembly is coupled to an aircraft.

14. The rotor assembly of claim 1, wherein the plurality of flexures are configured to reengage the plurality of friction pads to the stationary part of the motor when a speed of the rotor decreases below the speed threshold.

15. The rotor assembly of claim 1, wherein the plurality of flexures are configured to disengage the plurality of friction pads from the stationary part of the motor due to centrifugal force applied by a mass of each of the plurality of flexures.

16. The rotor assembly of claim 1, wherein the centrifugal de-clutch further comprises a plurality of proof masses, each proof mass coupled to a flexure.

17. The rotor assembly of claim 16, wherein the plurality of flexures are configured to disengage the plurality of friction pads from the stationary portion of the motor due to centrifugal force applied by the plurality of proof masses.

* * * * *